(12) United States Patent
Sheerin

(10) Patent No.: US 11,936,074 B2
(45) Date of Patent: Mar. 19, 2024

(54) RAPID ELECTROLYTE REPLENISHMENT SYSTEM FOR AERIAL DRONES

(71) Applicant: ALUMAPOWER CORPORATION, Huntsville (CA)

(72) Inventor: Geoffrey T. Sheerin, Sarnia (CA)

(73) Assignee: ALUMAPOWER CORPORATION, Huntsville (CA)

( * ) Notice: Subject to any disclaimer, the term of this patent is extended or adjusted under 35 U.S.C. 154(b) by 589 days.

(21) Appl. No.: 17/270,306

(22) PCT Filed: Aug. 22, 2019

(86) PCT No.: PCT/IB2019/001449
§ 371 (c)(1),
(2) Date: Feb. 22, 2021

(87) PCT Pub. No.: WO2020/121067
PCT Pub. Date: Jun. 18, 2020

(65) Prior Publication Data
US 2021/0202959 A1    Jul. 1, 2021

Related U.S. Application Data

(60) Provisional application No. 62/720,965, filed on Aug. 22, 2018.

(51) Int. Cl.
*H01M 6/50* (2006.01)
*B64C 39/02* (2023.01)
(Continued)

(52) U.S. Cl.
CPC ......... *H01M 6/5077* (2013.01); *B64C 39/024* (2013.01); *B64D 27/24* (2013.01); *B64D 37/30* (2013.01)

(58) Field of Classification Search
CPC ...... H01M 6/5077; H01M 6/50; H01M 10/42; H01M 10/4242; B64C 39/024
(Continued)

(56) References Cited

U.S. PATENT DOCUMENTS

| 4,246,324 A | 1/1981 | de Nora et al. |
| 4,448,858 A | 5/1984 | Graf et al. |

(Continued)

FOREIGN PATENT DOCUMENTS

| CA | 2368209 | 9/2000 |
| CA | 3078423 | 7/2021 |

(Continued)

OTHER PUBLICATIONS

EPO; Extended European Search Report dated May 3, 2022 for related European Application 19852156.9; 9 pages.
(Continued)

*Primary Examiner* — James M Erwin
(74) *Attorney, Agent, or Firm* — Peter J. Mikesell; Schmeiser, Olsen & Watts, LLP

(57) ABSTRACT

A metal air battery electrolyte replenishment system comprised of a base station with docking receptor apparatus and matching docking probe on a flying drone. The probe onboard the drone has a sensor that guides the drone to connect with the electrolyte docking receptor on the base station. The drone uses the probe to obtain fresh electrolyte and simultaneously expel spent electrolyte into the base station while still in flight or during a brief landing. Rapid exchange of the electrolyte allows for extended range and flight time without penalty of onboard electrolyte reconditioning system and its associated weight.

10 Claims, 11 Drawing Sheets

(51) Int. Cl.
*B64D 27/24* (2006.01)
*B64D 37/30* (2006.01)

(58) Field of Classification Search
USPC .......................................................... 429/405
See application file for complete search history.

(56) References Cited

U.S. PATENT DOCUMENTS

| | | | |
|---|---|---|---|
| 4,994,332 A | 2/1991 | Coin et al. | |
| 5,615,717 A | 4/1997 | Cheiky | |
| 6,384,569 B1 | 5/2002 | Pintz et al. | |
| 6,692,867 B2 | 2/2004 | Nark | |
| 6,921,985 B2 | 7/2005 | Janssen | |
| 7,629,705 B2 | 12/2009 | Barker | |
| 7,638,241 B2 | 12/2009 | Lee | |
| 8,691,446 B2 | 4/2014 | Sakata | |
| 8,941,363 B2 | 1/2015 | Kruglick | |
| 9,077,035 B2 | 7/2015 | Kita | |
| 9,166,251 B2 | 10/2015 | Katayama | |
| 9,224,516 B2 | 12/2015 | Nelson | |
| 9,350,019 B2 | 5/2016 | Sakata | |
| 9,698,398 B2 | 7/2017 | Kong | |
| RE47,520 E | 7/2019 | Zhang | |
| 10,930,932 B2 | 2/2021 | Tan | |
| 2006/0202088 A1 | 9/2006 | Padan | |
| 2014/0179535 A1 | 6/2014 | Stuckl et al. | |
| 2014/0193677 A1 | 7/2014 | Stuckl | |
| 2016/0111705 A1* | 4/2016 | Kisdarjono | H01M 4/76 429/406 |
| 2017/0240291 A1 | 8/2017 | Kim | |
| 2017/0327091 A1* | 11/2017 | Capizzo | C25B 9/17 |
| 2017/0346147 A1* | 11/2017 | Weisenstein | H01M 50/121 |
| 2018/0102577 A1* | 4/2018 | Choi | H01M 50/1385 |
| 2018/0191044 A1* | 7/2018 | Tzidon | H01M 4/043 |

FOREIGN PATENT DOCUMENTS

| | | | |
|---|---|---|---|
| CN | 108305407 | 7/2018 | |
| EP | 1029381 | 7/2002 | |
| EP | 1306917 A2 * | 5/2003 | B01J 7/02 |
| JP | 2001135363 | 5/2001 | |
| JP | 2013150440 | 8/2013 | |
| JP | 2015202860 | 11/2015 | |
| JP | 2017109553 | 6/2017 | |
| WO | WO-0189012 A2 * | 11/2001 | H01M 10/4214 |
| WO | WO2017154473 | 9/2017 | |

OTHER PUBLICATIONS

ISA/CA; International Search Report/Written Opinion for related International Application PCT/IB2021/062277 dated Apr. 14, 2022.
EPO; Extended European Search Report dated Apr. 4, 2022 for related European Application 19894838.2I.
ISA/CA; International Search Report/Written Opinion for corresponding International Application PCT/IB2019/001449 dated Aug. 12, 2020; 8 pages.

* cited by examiner

RAPID ELECTROLYTE REPLENISHMENT SYSTEM FOR AERIAL DRONES

CROSS-REFERENCE TO RELATED APPLICATIONS

This application claims priority to and is a non-provisional of U.S. Patent Application 62/720,965 (filed Aug. 22, 2018), the entirety of which is incorporated herein by reference.

BACKGROUND OF THE INVENTION

Metal air batteries, and specifically aluminum air batteries, provide high energy density power sources that show promising applications as mobile and stationary distributed power sources. They have the potential to replace the internal combustion engines, fuel cells, and other rechargeable batteries on drone aircraft since the energy density, efficiency of conversion approach those of hydrocarbon fuels.

Aluminum air batteries can operate in either batch mode or steady state mode. During operation of the battery, aluminum metal is consumed into the electrolyte with the formation of aluminates eventually saturating the electrolyte solution and ultimately halting the battery operation. Approximately 1 kg of potassium hydroxide or sodium hydroxide electrolyte will allow the release upwards of 400 Wh of energy before becoming exhausted and in need of replenishment.

In steady state mode the aluminate is crystallized out of solution to form an insoluble hydroxide called hydrargillite, $Al(OH)_3$. These crystals are conventionally filtered out of the electrolyte flow and stored for later retrieval from the battery system. The retrieved crystals can be converted back into aluminum at a refurbishing facility. The advantage of this electrolyte refurbishing system is the power curve for the battery stays constant during operation with only the addition of water and aluminum materials needed to recharge the battery.

In batch mode the aluminum air battery operates until the electrolyte is saturated with aluminates. At saturation, the aluminates need to be removed for processing outside of the battery system and fresh electrolyte introduced in order to continue battery operation. This system has the disadvantage of reducing power output from the battery over time but with the added advantage of a simpler lighter weight overall battery system because all that is needed is storage of electrolyte for use.

Flying drones are being considered for many tasks that previously were done by aerial human-operated systems. For example, drones are used for the delivery of packages for the last few miles to customers, the long-range surveillance of power lines or pipelines for safety and monitoring the conditions of crops on farmers' fields. Currently rechargeable lithium ion batteries are being used to power drones in these applications with severe limits on flight times and range. These limitations increase with heavy payloads. To mitigate this issue internal combustion (IC) engines with generators or fuel cells have been installed on drones in an attempt to increase their range and payload. Part of the problem with these systems is the onboard storage of flammable or explosive liquids and gases including the additional weights of the support systems for each power unit.

An improved method for permitting long term use of aerial drones is therefore desired. Unfortunately, no solution has been found to be entirely satisfactory.

The discussion above is merely provided for general background information and is not intended to be used as an aid in determining the scope of the claimed subject matter.

SUMMARY

A metal air battery electrolyte replenishment system comprised of a base station with docking receptor apparatus and matching docking probe on a flying drone. The probe onboard the drone has a sensor that guides the drone to connect with the electrolyte docking receptor on the base station. The drone uses the probe to obtain fresh electrolyte and simultaneously expel spent electrolyte into the base station while still in flight or during a brief landing. Rapid exchange of the electrolyte allows for extended range and flight time without penalty of onboard electrolyte reconditioning system and its associated weight.

In a first embodiment, an aerial drone system is provided. The aerial drone system comprising: an aerial drone comprising: a metal air battery; a heat exchanger; an array of sensors for detecting a receptacle; an electrolyte tank comprising (1) a first bladder with a first inlet valve and a first outlet valve and (2) a second bladder with a second inlet valve and a second outlet valve, the first bladder and the send bladder being separated by a flexible membrane; a probe that is fluidly connected to the electrolyte tank, the probe comprising: a fill port selectively connected to either (1) a first fill valve connecting to the first bladder or (2) a second fill valve connecting to the second bladder; a drain valve for selectively connecting to either the first bladder or the second bladder through a common drain line; an electrolyte pump fluidly connected to the metal air battery, the heat exchanger, the common drain line and selectively connected to either the first bladder or the second bladder through the first inlet valve or the second inlet valve, respectively; rapid electrolyte replenishment system comprising: the receptacle for receiving the probe, the receptacle comprising an aperture for receiving the fill port; at least one drain hole for receiving electrolyte from the drain valve; a feed pump for pumping electrolyte from an electrolyte tank to the aperture; a vacuum pump for pumping electrolyte from the at least one drain hole to an electrolyte storage tank.

In a second embodiment, a method for refreshing electrolyte of a metal air battery on an aerial drone is provided. The method comprising: docking the aerial drone o with the receptacle of the rapid electrolyte replenishment system, wherein the docking comprises inserting the fill port to the aperture; opening the drain valve and the first fill valve; actuating the feed pump and pumping electrolyte from the electrolyte tank, through the first fill valve and into the first bladder while simultaneously actuating the vacuum pump to collect spent electrolyte in the at least one drain hole that is expelled from the second bladder through the common drain line; closing the drain valve and the first fill valve; closing the second inlet valve and the second out valve while simultaneously opening the first inlet valve and the first outlet valve such that the electrolyte pump is placed inline with the first bladder; un-docking the aerial drone from the receptacle of the rapid electrolyte replenishment system.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
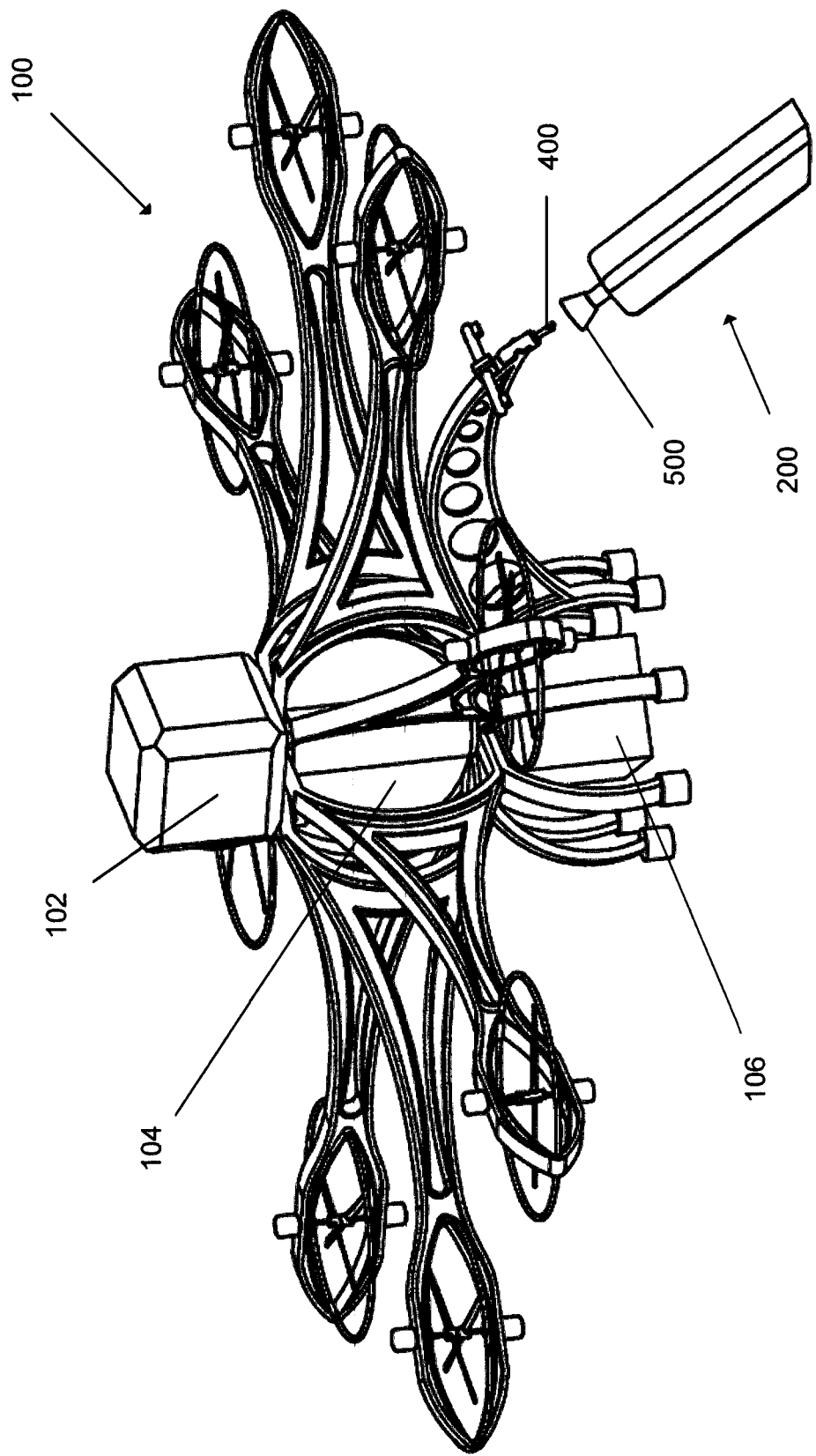
FIG. 1 is depiction of a drone about to dock with a rapid electrolyte replenishment system.

Referring to FIG. 1, a drone 100 for delivery of a payload 106 is shown. The drone 100 is configured for batch operation of a metal air battery 102 that provides power for the drone 100. The drone 100 has the conventional components of a drone including a plurality of propellers, a wireless communication device and a microprocessor for controlling functions of the drone 100. The drone system 100 further comprises electrolyte storage tank 104 that has enough volume to hold electrolyte for a few hours of normal operation. As the electrolyte becomes saturated with aluminates, the metal air battery 102 falls below a power output threshold. This triggers a protocol that causes the drone 100 to fly to a base station where a rapid electrolyte replenishment system 200 is located. While in flight the drone advances forward so that an onboard probe 400 attaches to a receptacle 500 and simultaneously transfers fresh electrolyte into the storage tank 104 while removing the spent electrolyte. This happens in just seconds at which point the drone 100 flies away and continues its mission to deliver payload 106. This configuration removes the weight and complexity from the drone found on many conventional steady state systems. That weight can be directly used for payload 106 and structure in the drone.

Figure 2A:
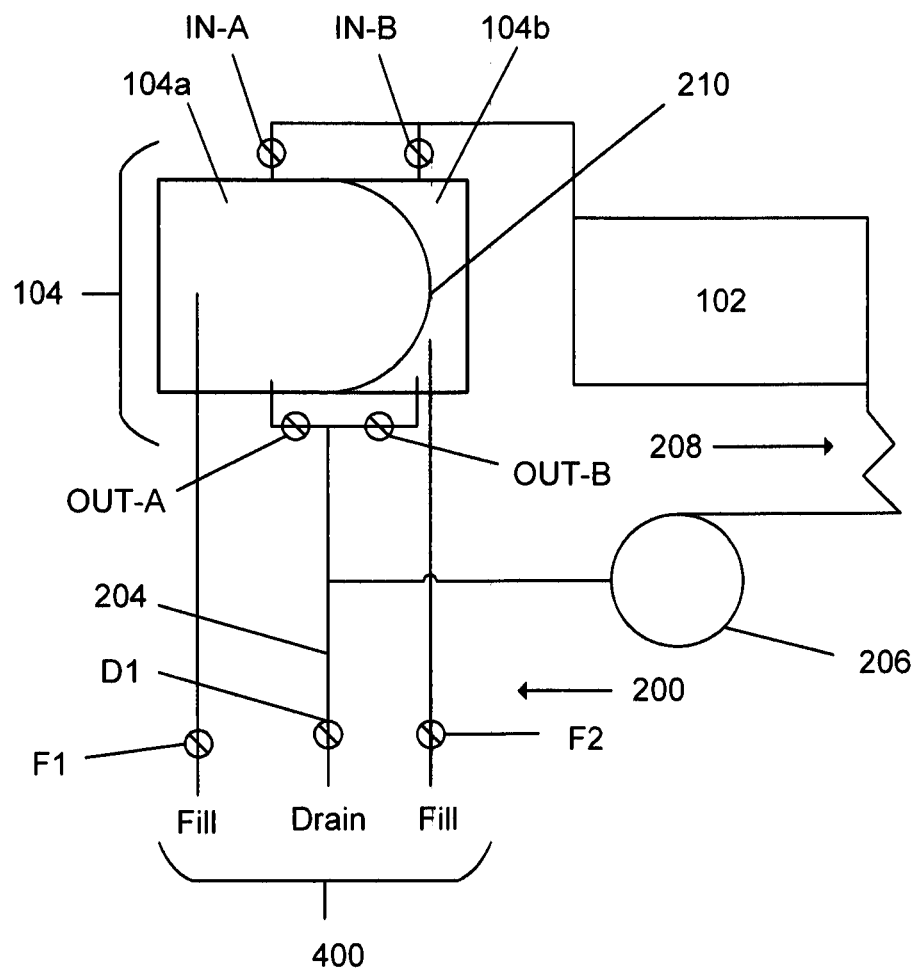
FIG. 2A is a schematic depiction of select components of the drone.

FIG. 2A is a schematic depiction of select components of the drone 100. The drone 100 comprises the tank 104 for storing electrolyte, the metal air battery 102 and a docking probe 400. The drone 100 contains a small pump 206 for circulation of the electrolyte through the battery 102 and heat exchanger 208. The tank 104 has a double bladder system separated by a flexible membrane 210 so that as one bladder is filled the other is emptied. This causes the electrolyte being filled to push out the electrolyte in the other bladder simultaneously.

Figure 2B:
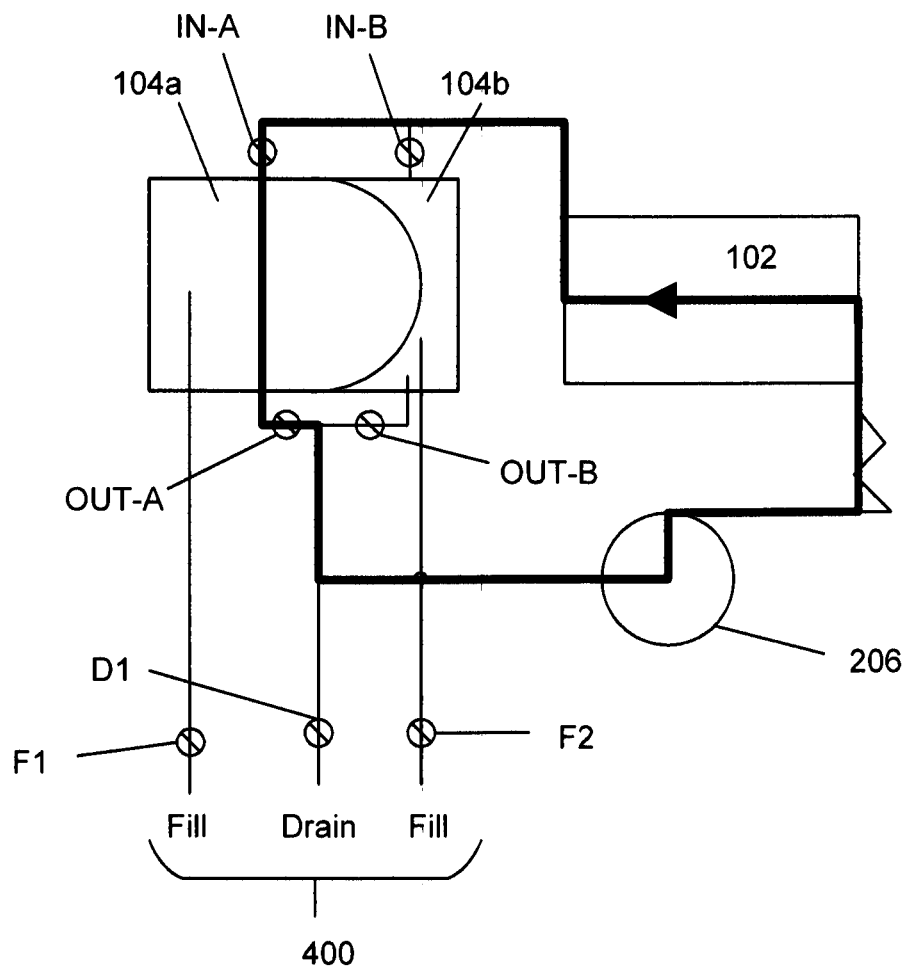
FIGS. 2B to 2E are schematic depictions showing fluid pathways during different stages of refilling the drone with electrolyte.

FIG. 2B depicts a fluid path when the metal air battery 102 is using electrolyte from bladder 104a. The pump 206 pumps electrolyte from the bladder 104a, through valve OUT-A, through heat exchanger 208 and into metal air battery 102. Thereafter, the electrolyte is returned to bladder 104a through valve IN-A. The electrolyte is slowly consumed by operation of the metal air battery 102. After a predetermined condition is satisfied (e.g. the battery drops below a threshold power output or a predetermined time of operation) the drone docks with the rapid electrolyte replenishment system 200, at which time the fluid path changes to the fluid path of FIG. 2C.

Figure 2C:
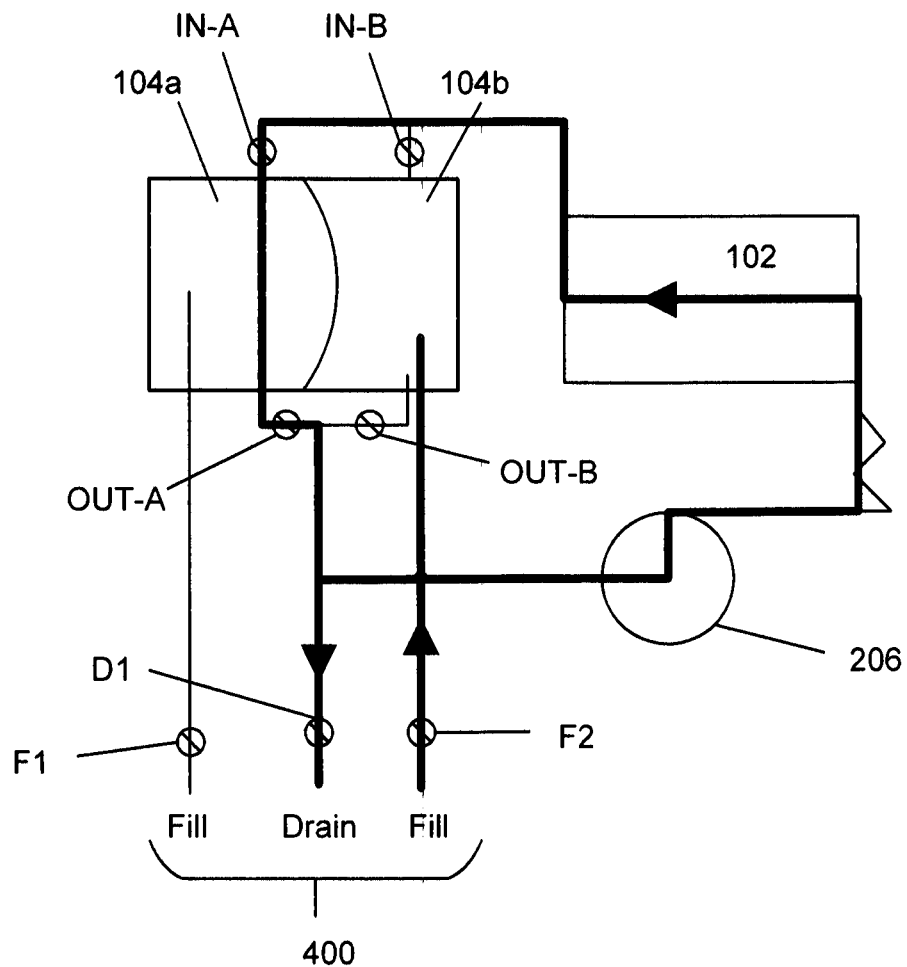

In FIG. 2C, fill valve F2 and drain valve D1 are opened. The pump 206 continues to pump electrolyte through the fluid path shown in FIG. 2B as fresh electrolyte is simultaneously pumped into bladder 104b through fill valve F2. The fresh electrolyte causes bladder 104b to expand which compresses bladder 104a. This compression causes excess spent electrolyte to be pushed from bladder 104a through drain valve D1 that connects to a common drain line 204. The filling and expulsion of the fresh and spent electrolyte continues until a predetermine volume of electrolyte has been exchanged. For example, the fluid exchange may continue until a volume of electrolyte equal to 90% of the volume of the tank 104 has been exchanged. Once complete, the fluid path changes to the fluid path of FIG. 2D.

Figure 2D:
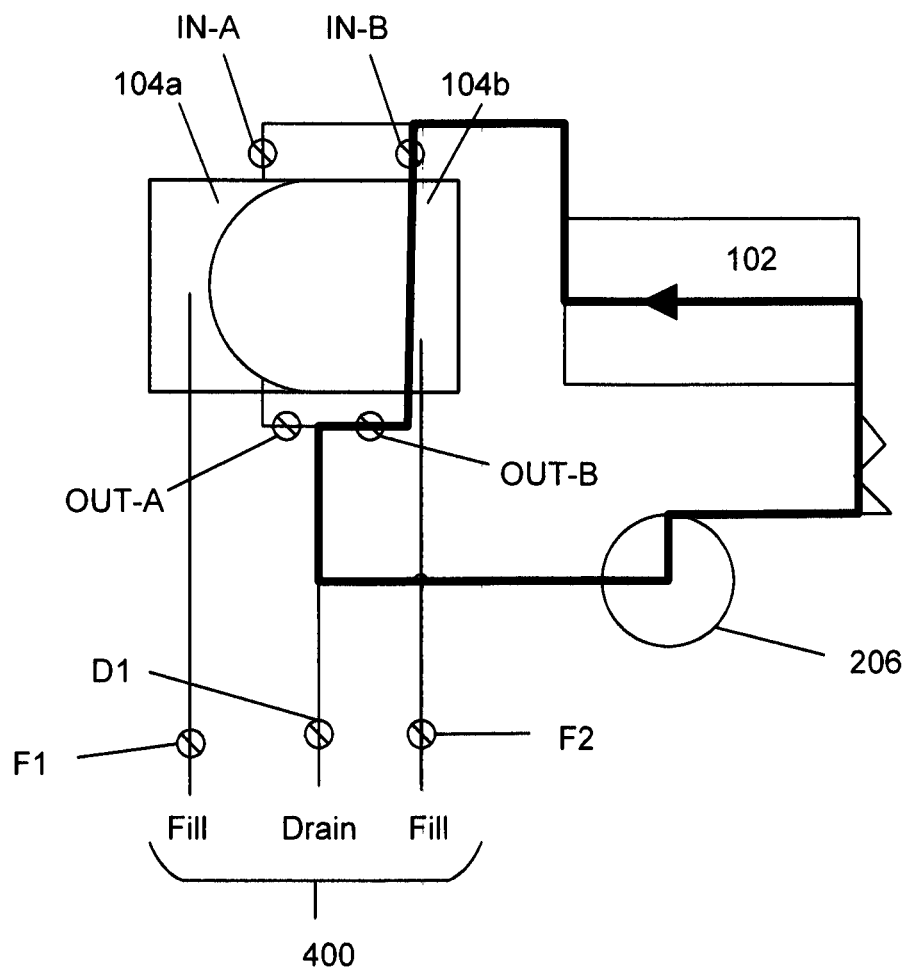

In FIG. 2D, the fill valve F2 and drain valve D1 are closed. Simultaneously, valves IN-A and OUT-A are closed to seal off bladder 104a while valves IN-B and OUT-B are opened to place bladder 104b inline with the pump 206. When the electrolyte in bladder 104b is sufficiently consumed, the drone 100 docks with the rapid electrolyte replenishment system 200, at which time the fluid path changes to the fluid path of FIG. 2E.

Figure 2E:
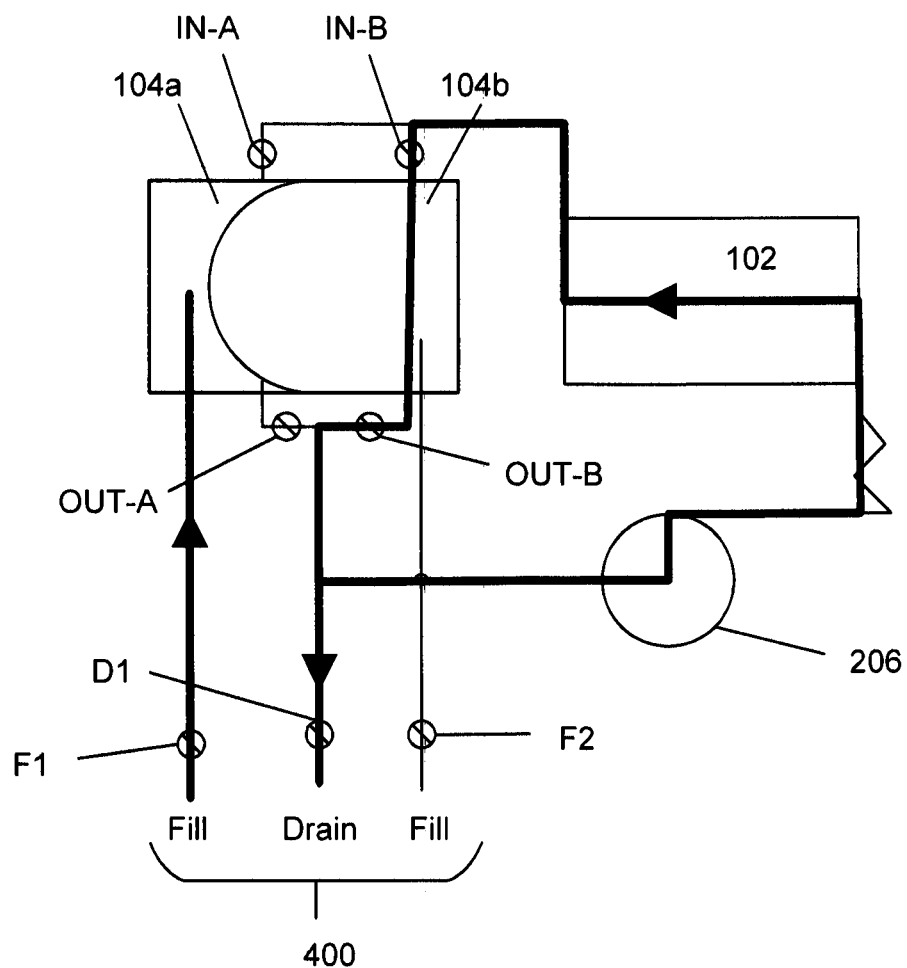

The fluid path in FIG. 2E is analogous to the fluid path of FIG. 2C except in that bladder 104a is being filled through fill valve F1 while bladder 104b is being drained through drain valve D1. When the filling and draining are complete, the drone 100 has returned to the status shown in FIG. 2B.

Figure 3:
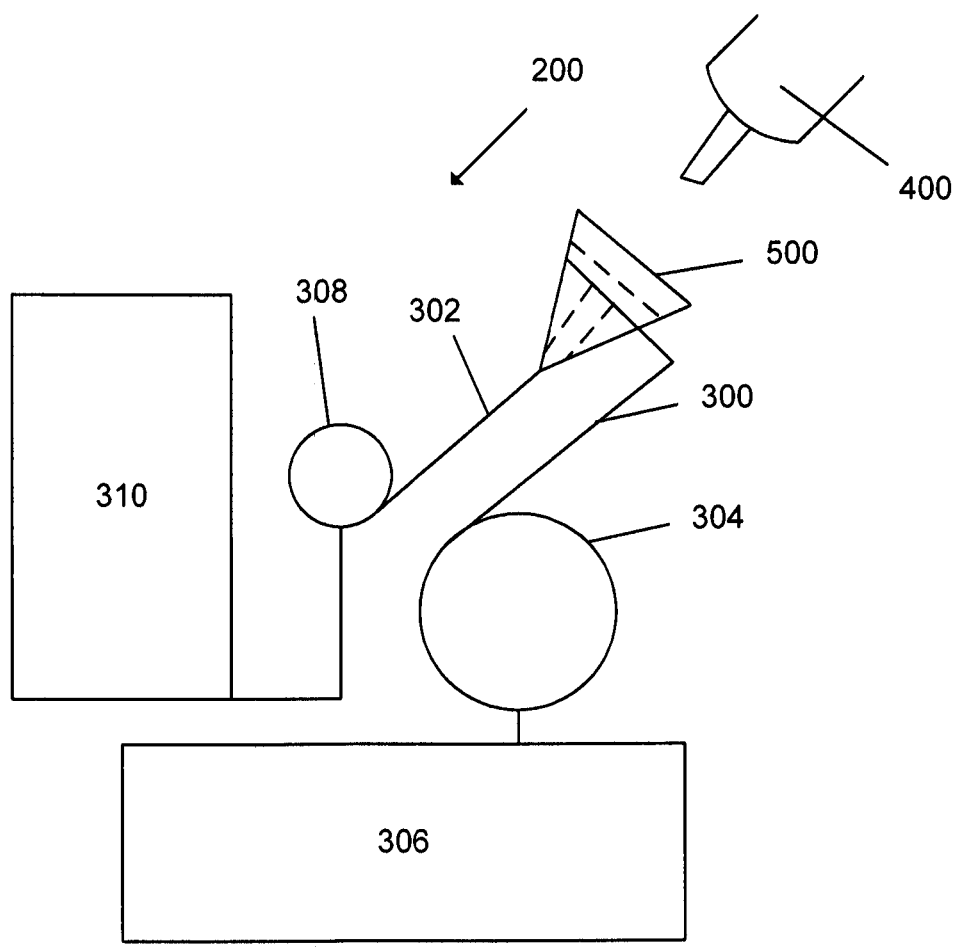
FIG. 3 is a schematic depiction of the rapid electrolyte replenishment system.

As shown in FIG. 3, the probe 400 docks at the receptacle 500 of the rapid electrolyte replenishment system 200 and fluidly connects the probe 400 with both an electrolyte recovery line 300 and an electrolyte supply line 302. A feed pump 308 supplies pressurized electrolyte from a fresh electrolyte tank 310 to the current bladder 104a, 104b through the respective fill valve F1, F2. A vacuum pump 304 evacuates spent electrolyte that is being deposited in the receptacle 500 and stores the spent electrolyte in spent electrolyte tank 306. The flow of vacuumed air helps evacuate the receptacle 500 quickly and also removes drips from the probe 400 upon departure from the rapid electrolyte replenishment system 200. The feed pump 308 and vacuum pump 304 on the rapid electrolyte replenishment system 200 fills and empties the bladders with the onboard pump 206 continually circulating electrolyte through the battery 102 on the drone 100. Advantageously, this permits electrolyte exchange while the battery 102 is in operation.

Figure 4:
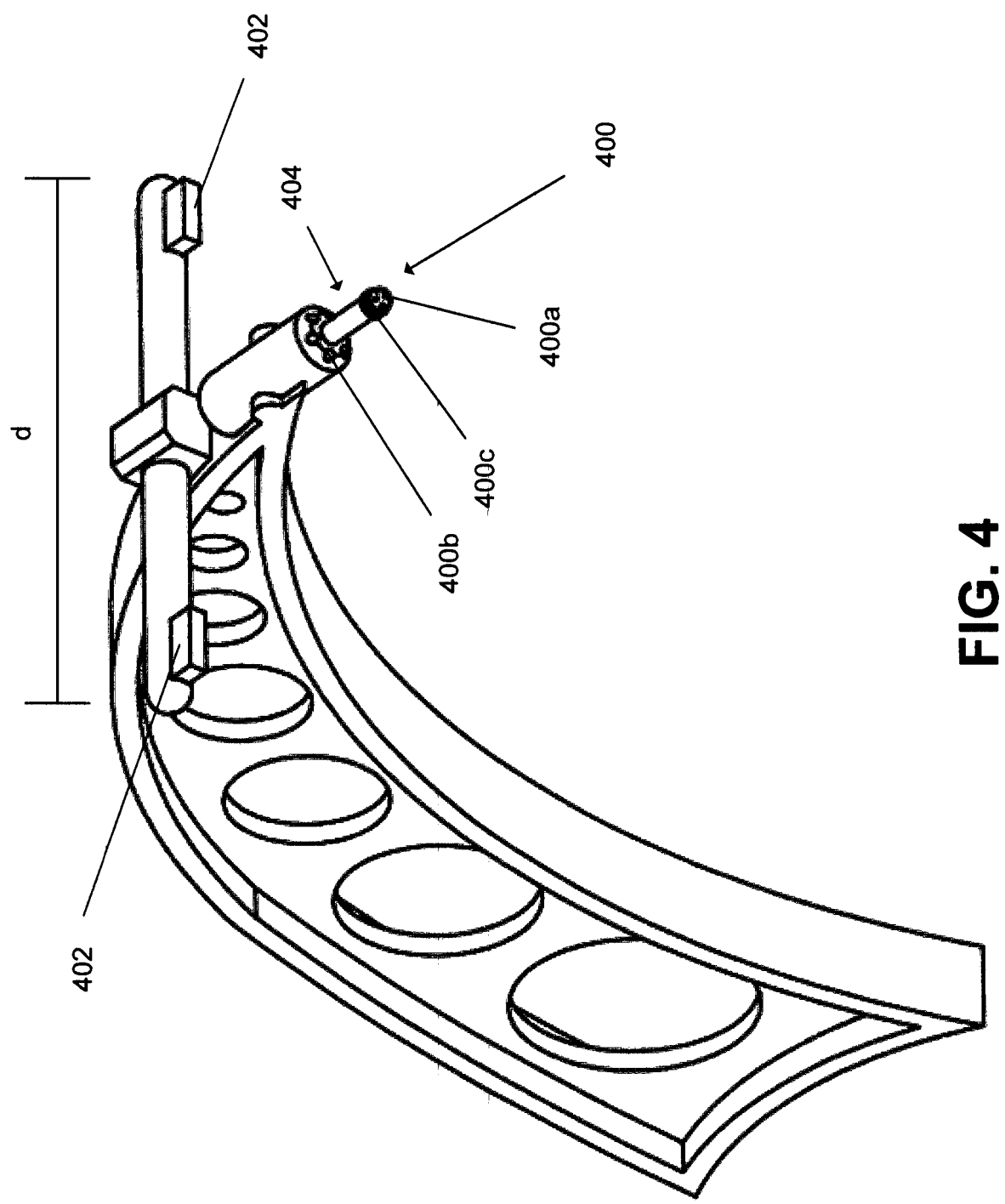
FIG. 4 depicts a probe of the drone.
Figure 5A:
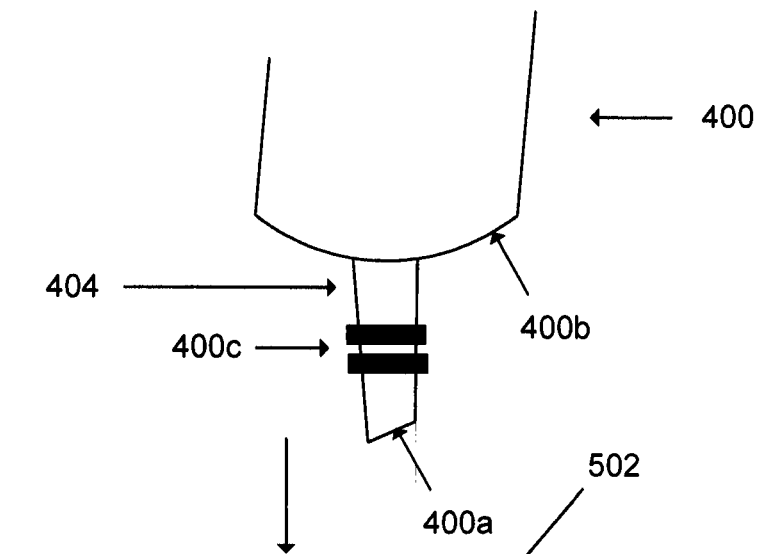
FIG. 5A depicts the probe before docking with the rapid electrolyte replenishment system.
Figure 5B:
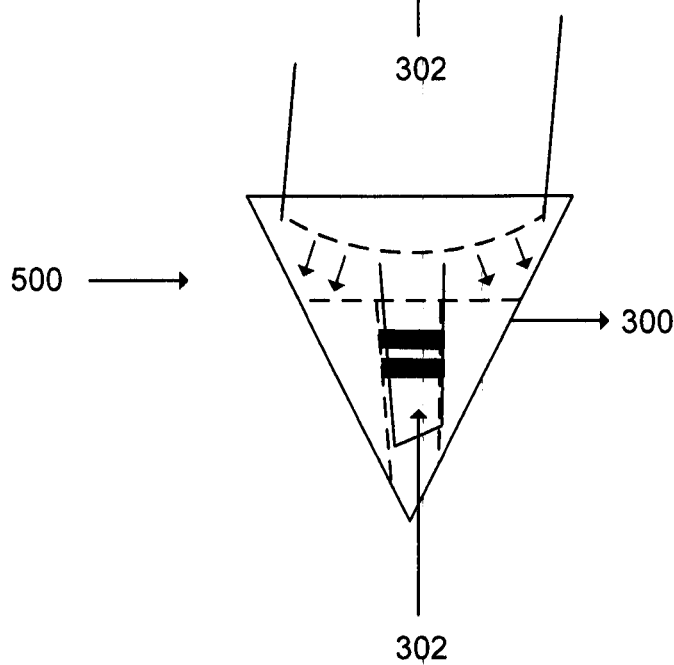
FIG. 5B depicts the probe after docking with the rapid electrolyte replenishment system.

FIG. 4 depicts the probe 400 in further detail. The probe 400 has an elongated protrusion that that helps guide the probe 400 to the receptacle 500 of the rapid electrolyte replenishment system 200. The probe 400 has a center fill port 400a at the terminus of the elongated protrusion that leads to both fill valve F1 and fill valve F2. An array of sensors 402 is present that help position the probe 400 in the receptacle 500. In one embodiment, at least two sensors 402 are present that are separated by a distance (d) of at least one cm. Such a configuration provides a stereoscopic view of the receptacle 500 which facilitates docking. In one embodiment, the sensor 402 is a three-dimensional (3D) stereo camera. There is also at least one O-ring 400c on the probe 400 that fits within the receptacle 500 and allows for high pressure feed of electrolyte into the onboard tank 104. The drain holes 400b connect to drain valve D1 and discharge the spent electrolyte into the receptacle 500. The receptacle 500 is mounted high enough off the ground or surface to allow for clearance of the drone 100 to refuel in flight or while landed on a small platform. FIG. 5A and FIG. 5B provide more detailed views of the docking of the probe 400 in the receptacle 500.

Figure 6:
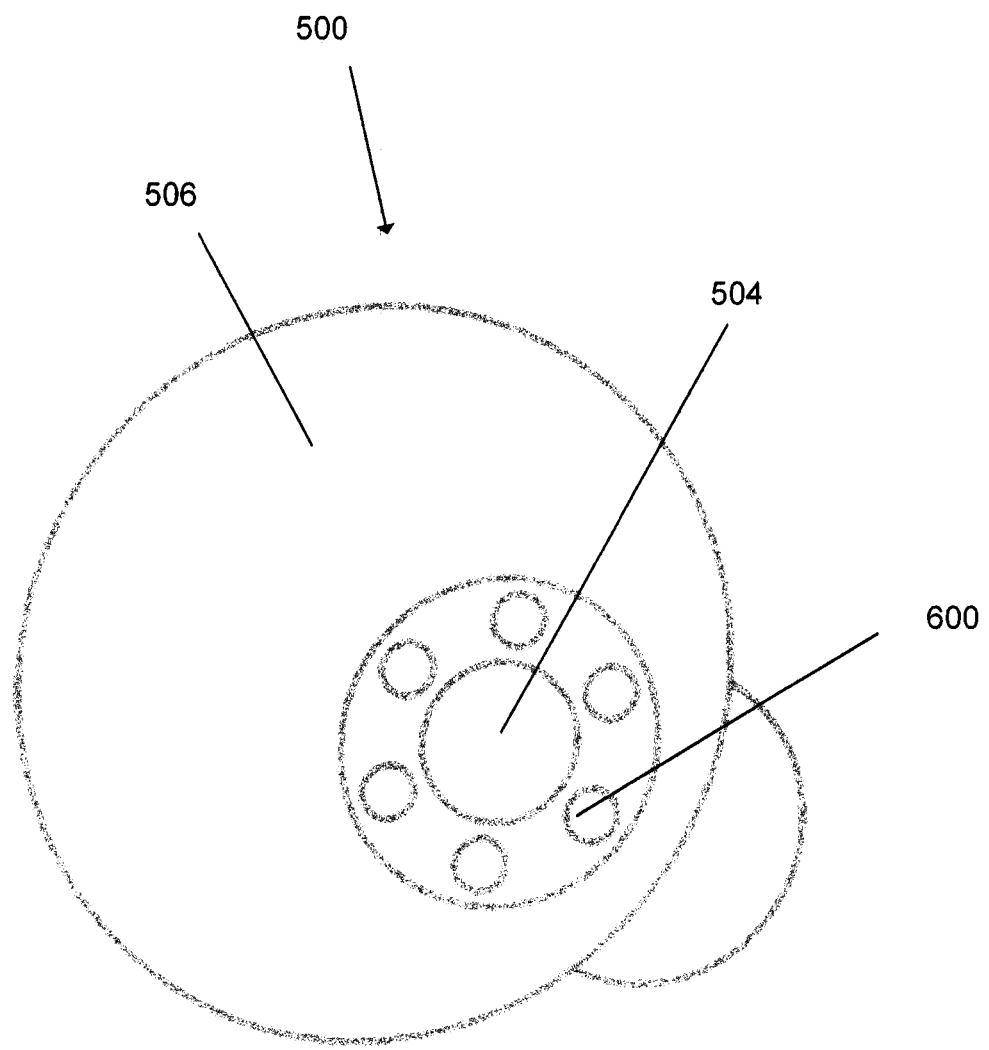
FIG. 6 depicts a receptacle of the rapid electrolyte replenishment system.
Figure 7:
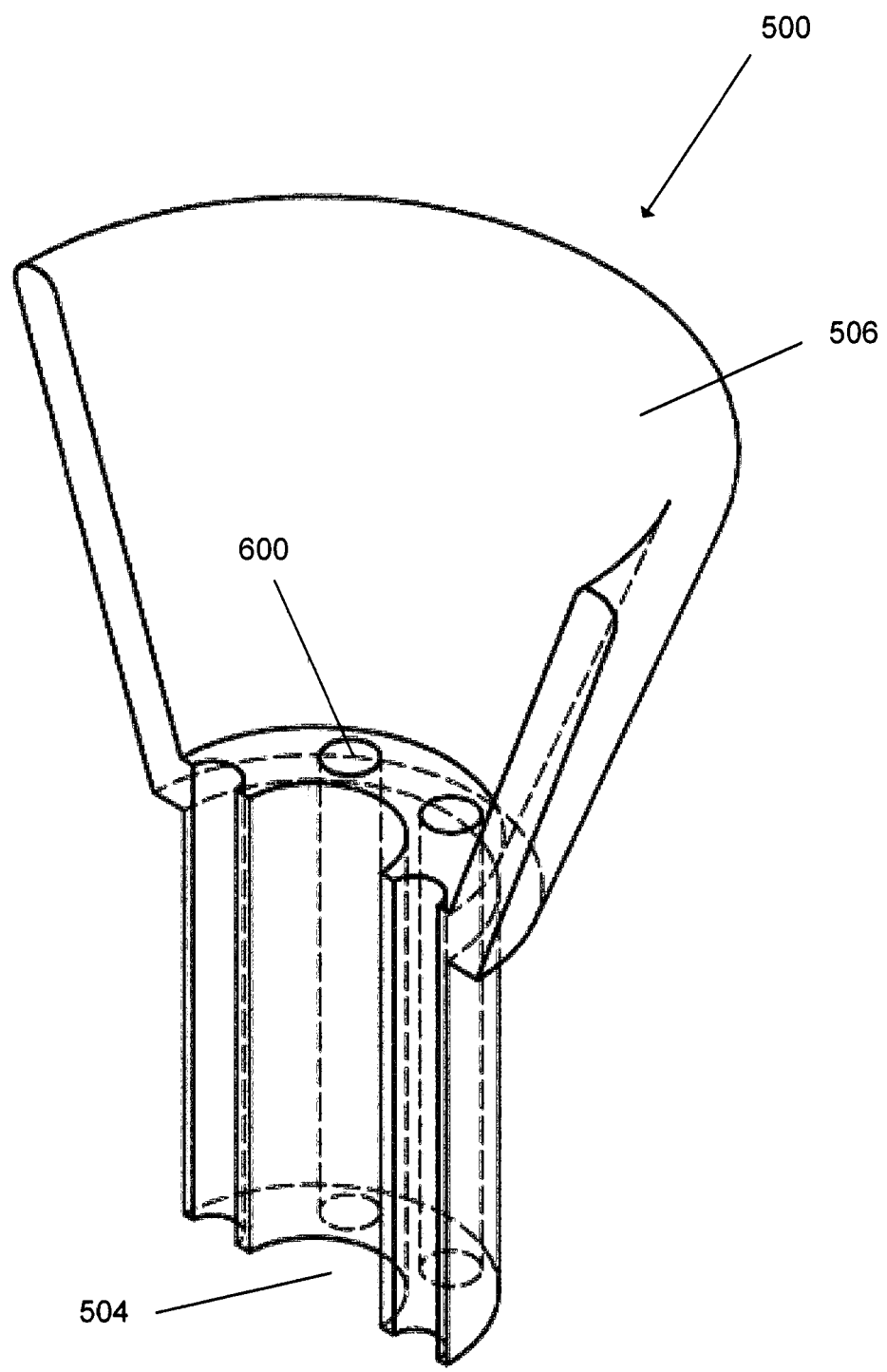
FIG. 7 is a cutaway view of a receptacle for receiving a probe of the drone.

As shown in FIG. 5A, the receptacle 500 has a drip cup 502 defined by walls 506 with center aperture 504 on the bottom. The center aperture 504 is circumscribed by drain vacuum holes 600 (FIG. 6) that fluidly connect to the electrolyte recovery line 300. The center aperture 504 fluidly connects to the electrolyte supply line 302. As the probe 400 approaches the receptacle 500, the elongated protrusion 404 inserts into the center aperture 504 until the O-ring 400c engages with the surrounding walls. FIG. 5B depicts the assembly after the engagement has occurred. Fresh electrolyte is provided through the electrolyte supply line 302 while spent electrolyte is evacuated through the drain holes 400b and flows into the drain vacuum holes 600. Due to the presence of the drip cup 502, the drain holes 400b do not need to form a fluid-tight seal with the drain vacuum holes 600. FIG. 7 is a cutaway view of the receptacle 500 that further illustrates the drain vacuum holes 600 and the center aperture 504.

In some embodiments, a network with multiple systems is present to service multiple drones. Each rapid electrolyte replenishment system 200 has a computer network that reports availability of electrolyte to a central network so service of each individual system can be accomplished in a timely manner and allow other drones to determine which station is either occupied or out of electrolyte. Global Positioning System (GPS) coordinates for each rapid electrolyte replenishment system 200 is used to guide the drone 100 to the approximate location with optical docking in the last half meter to fill and drain the drone 100.

The drone 100 includes a microprocessor for selectively actuating each of the valves according to pre-programmed instructions. The microprocessor also monitors the fill status of the bladders 104a, 104b to determine the volume of each bladder during the refill/drain process. The volume of each bladder is determined using any of a variety of conventional sensors such as pressure sensors, ultrasonic sensors, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aerial drone system comprising:
   an aerial drone comprising:
      a metal air battery;
      a heat exchanger;
      an array of sensors for detecting a receptacle;
      an electrolyte tank comprising (1) a first bladder with a first inlet valve and a first outlet valve and (2) a second bladder with a second inlet valve and a second outlet valve, the first bladder and the second bladder being separated by a flexible membrane;
      a probe that is fluidly connected to the electrolyte tank, the probe comprising:
         a fill port selectively connected to either (1) a first fill valve connecting to the first bladder or (2) a second fill valve connecting to the second bladder;
         a drain valve for selectively connecting to either the first bladder or the second bladder through a common drain line;
      an electrolyte pump fluidly connected to the metal air battery, the heat exchanger, the common drain line and selectively connected to either the first bladder or the second bladder through the first inlet valve or the second inlet valve, respectively;
   rapid electrolyte replenishment system comprising:
      the receptacle for receiving the probe, the receptacle comprising an aperture for receiving the fill port;
      at least one drain hole for receiving electrolyte from the drain valve;
      a feed pump for pumping electrolyte from an electrolyte tank to the aperture;
      a vacuum pump for pumping electrolyte from the at least one drain hole to an electrolyte storage tank.

2. The aerial drone system as recited in claim 1, wherein the fill port further comprises an elongated protrusion that fits within the aperture of the receptacle.

3. The aerial drone system as recited in claim 2, wherein the elongated protrusion comprises at least one O-ring.

4. The aerial drone system as recited in claim 1, wherein the at least one drain hole is disposed in a drip cup of the receptacle.

5. The aerial drone system as recited in claim 1, wherein the at least one drain hole comprises a plurality of drain holes.

6. The aerial drone system as recited in claim 5, wherein the aperture is circumscribed by the plurality of drain holes.

7. The aerial drone system as recited in claim 1, wherein the array of sensors comprises a first sensor and a second sensor that are spaced by a distance of at least one 1 cm.

8. The aerial drone system as recited in claim 1, wherein the array of sensors comprises three-dimensional (3D) stereo cameras.

9. A method for refreshing electrolyte of a metal air battery on an aerial drone, the method comprising:
   docking the aerial drone of claim 1 with the receptacle of the rapid electrolyte replenishment system as recited in claim 1, wherein the docking comprises inserting the fill port to the aperture;
   opening the drain valve and the first fill valve;

actuating the feed pump and pumping electrolyte from the electrolyte tank, through the first fill valve and into the first bladder while simultaneously actuating the vacuum pump to collect spent electrolyte in the at least one drain hole that is expelled from the second bladder through the common drain line;

closing the drain valve and the first fill valve;

closing the second inlet valve and the second outlet valve while simultaneously opening the first inlet valve and the first outlet valve such that the electrolyte pump is placed inline with the first bladder;

un-docking the aerial drone from the receptacle of the rapid electrolyte replenishment system.

10. The method as recited in claim 9, further comprising;

docking the aerial drone with the receptacle of the rapid electrolyte replenishment system;

opening the drain valve and the second fill valve;

actuating the feed pump and pumping electrolyte from the electrolyte tank, through the second fill valve and into the second bladder while simultaneously collecting spent electrolyte in the at least one drain hole that is expelled from the first bladder through the common drain line;

closing the drain valve and the second fill valve;

closing the first inlet valve and the first outlet valve while simultaneously opening the second inlet valve and the second outlet valve such that the electrolyte pump is placed inline with the second bladder;

un-docking the aerial drone from the receptacle of the rapid electrolyte replenishment system.

\* \* \* \* \*